United States Patent
Wuester, Sr. et al.

(10) Patent No.: US 8,424,418 B1
(45) Date of Patent: Apr. 23, 2013

(54) SYSTEMS AND METHODS FOR COUPLING SCREWDRIVERS TO SCREW FINDERS

(75) Inventors: David Wuester, Sr., San Jose, CA (US); Jambunathan Vangal-Ramamurthy, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 363 days.

(21) Appl. No.: 12/895,238

(22) Filed: Sep. 30, 2010

(51) Int. Cl.
*B25B 13/00* (2006.01)

(52) U.S. Cl.
USPC .............................................. 81/54; 81/57.37

(58) Field of Classification Search .................. 81/57.37, 81/429, 54, 177.75, 177.85, 57.14, 57.3, 81/57.39; 29/428
See application file for complete search history.

(56) References Cited

U.S. PATENT DOCUMENTS

| | | | |
|---|---|---|---|
| 4,613,000 A * | 9/1986 | Moore | 81/429 |
| 4,661,037 A * | 4/1987 | Sugino et al. | 414/729 |
| 5,609,079 A * | 3/1997 | Hashimoto | 81/177.75 |
| 6,142,043 A * | 11/2000 | Schweiger | 81/177.75 |
| 6,297,921 B1 | 10/2001 | Price, Jr. et al. | |
| 6,914,738 B2 | 7/2005 | Fujiwara et al. | |
| 6,972,920 B2 | 12/2005 | Kim et al. | |
| 7,023,641 B2 | 4/2006 | Doi et al. | |
| 7,242,544 B2 | 7/2007 | Price, Jr. et al. | |
| 7,372,649 B2 | 5/2008 | VanEaton et al. | |
| 7,549,204 B1 | 6/2009 | Vangal-Ramamurthy et al. | |
| 7,660,064 B2 | 2/2010 | Howley et al. | |
| 7,786,754 B2 | 8/2010 | Contreras et al. | |
| 8,196,496 B2 * | 6/2012 | Shih et al. | 81/57.37 |
| 2004/0184177 A1 | 9/2004 | Doi et al. | |
| 2004/0196582 A1 | 10/2004 | VanEaton et al. | |
| 2005/0007686 A1 | 1/2005 | Bloodworth et al. | |
| 2005/0174673 A1 | 8/2005 | Price, Jr. et al. | |
| 2005/0235785 A1 * | 10/2005 | Chang | 81/177.75 |
| 2005/0237785 A1 | 10/2005 | Venca et al. | |
| 2005/0254159 A1 | 11/2005 | Venca et al. | |
| 2007/0211365 A1 | 9/2007 | Yamazaki | |
| 2008/0151406 A1 | 6/2008 | Takahashi | |
| 2008/0204914 A1 | 8/2008 | Hashizume | |
| 2009/0009903 A1 | 1/2009 | Lee et al. | |

OTHER PUBLICATIONS

U.S. Appl. No. 12/353,707 to Jung, et al. filed Jan. 14, 2009, pp. 1-19.

\* cited by examiner

*Primary Examiner* — Hadi Shakeri (57) ABSTRACT

A floating head couples a screwdriver to a screw finder. The floating head includes a screwdriver attachment assembly that attaches to a screwdriver for driving a first rotation member (FRM). The floating head includes a screw finder attachment assembly that attaches to a bit of a screw finder such that driving a second rotation member (SRM) drives the bit. The floating head includes a ball shaft having a first end portion (EP) engaged in a first socket of the FRM and a second EP engaged in a second socket of the SRM. When the FRM is driven by the screwdriver, the ball shaft translates rotation of the FRM to the SRM. When the FRM and the SRM are displaced relative to one another, the ball shaft tilts such that the first EP maintains engagement with the first socket and the second EP maintains engagement with the second socket.

20 Claims, 6 Drawing Sheets

SYSTEMS AND METHODS FOR COUPLING SCREWDRIVERS TO SCREW FINDERS

FIELD

The present invention generally relates to manufacturing and assembly equipment and, in particular, relates to systems and methods for coupling screwdrivers to screw finders.

BACKGROUND

A screw finder may be aligned with a screwdriver such that a bit of the screwdriver is also aligned with a screw disposed in the screw finder. Once the bit is aligned with the screw, the screwdriver can drive the screw using the bit. Screw finders and screwdrivers are typically used in the manufacture of hard drives. As hard drives become increasingly smaller (and hence the screws used to fasten components to manufacture the hard drives), it is important to increase the precision and accuracy of the alignment between the bits and the screws. A bit can be tilted and/or shifted out of position with respect to a screw, thereby causing the bit to scrape or strip the head of the screw and/or to drive the screw at an undesired angle into a component. In such a scenario, undesired particles may be shed from the screw, the bit, and/or the component, resulting in contamination of a hard drive. It is therefore desirable to couple screwdrivers to screw finders such that the bits can maintain accurate alignment with the screws.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

Figure 1:
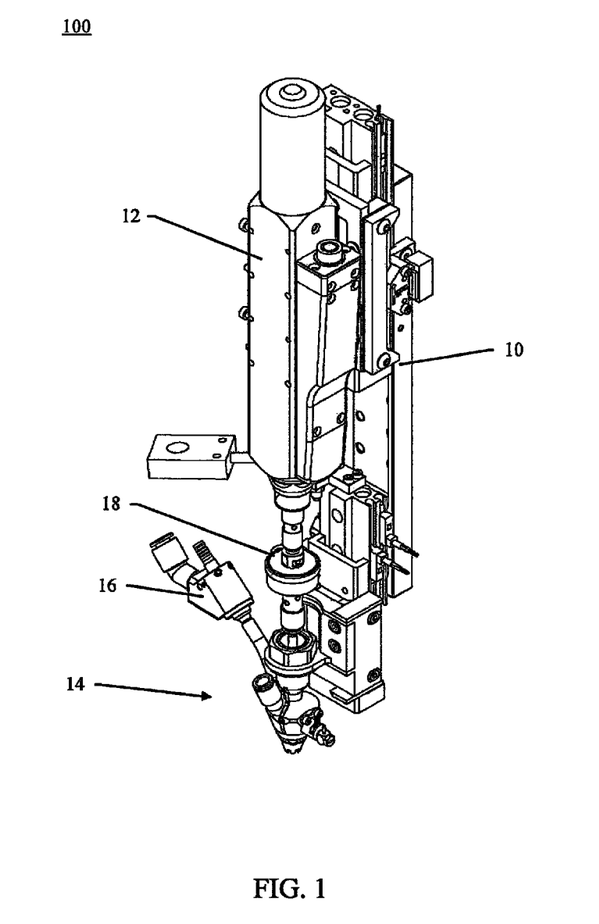
FIG. 1 illustrates a perspective view of a screw driving system, in accordance with various aspects of the subject technology.

FIG. 1 illustrates a perspective view of screw driving system 100, in accordance with various aspects of the subject technology. Screw driving system 100 comprises main body 10, screwdriver 12 attached to main body 10, screw finder 14 attached to main body 10, and floating head 18 coupling screwdriver 12 to screw finder 14. Screw finder 14 comprises feeder assembly 16 configured to feed a screw into a screw chamber defined in screw finder 14. A bit extends through screw finder 14 into the screw chamber and engages the screw. Screwdriver 12 is used to drive the bit to drive the screw. According to various aspects of the subject technology, floating head 18 couples screwdriver 12 to screw finder 14 such that the bit driven by screwdriver 12 maintains accurate alignment with the screw disposed in the screw chamber of screw finder 14. In some aspects, floating head 18 allows screwdriver 12 to drive the bit while providing flexibility for screwdriver 12 to be out of alignment with screw finder 14.

Figure 2:
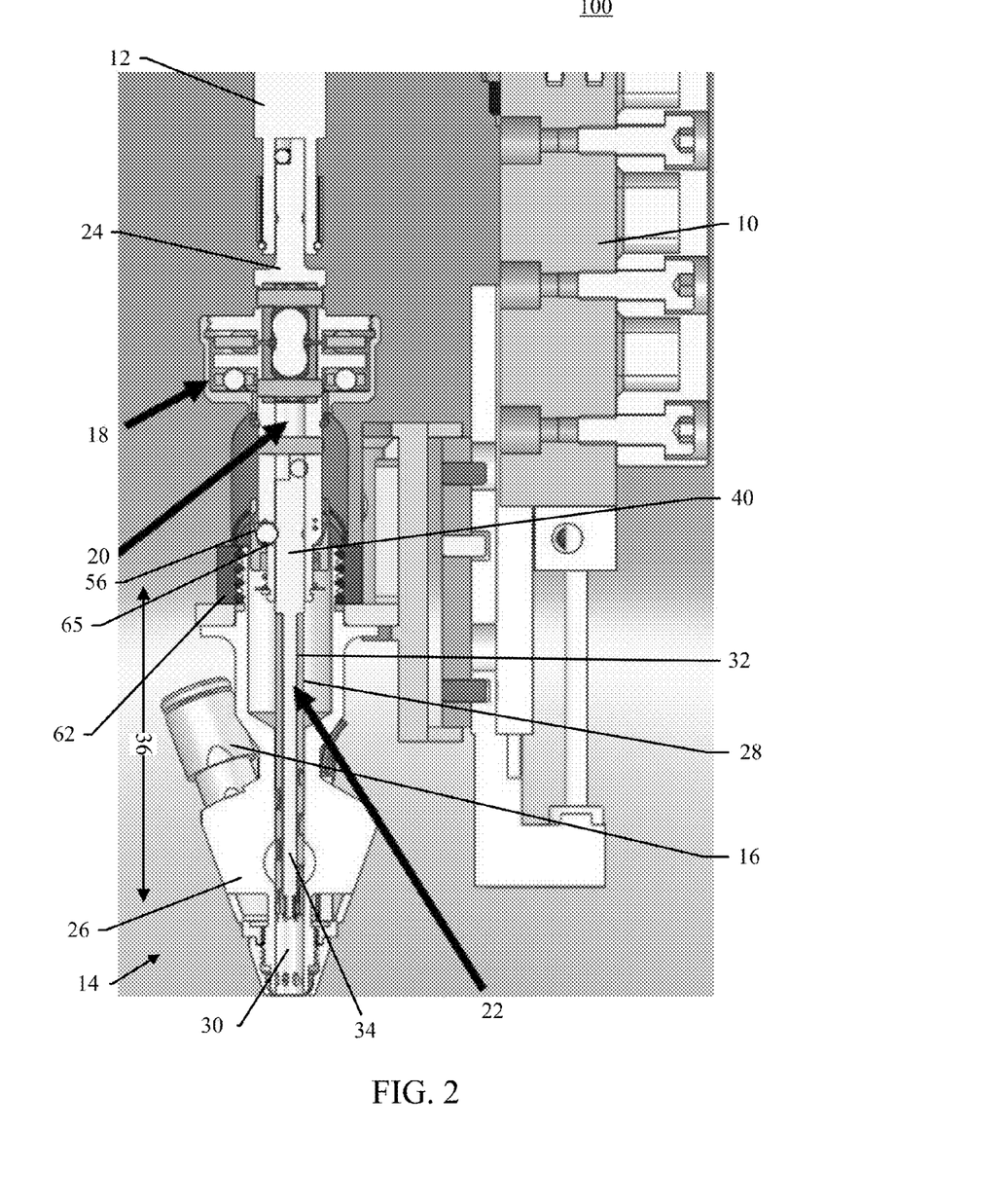
FIG. 2 illustrates a cross-sectional view of a screw driving system, in accordance with various aspects of the subject technology.

FIG. 2 illustrates a cross-sectional view of screw driving system 100, in accordance with various aspects of the subject technology. As shown in FIG. 2, screw finder 14 comprises finder body 26 and bit 22 extending through bore 28 that is defined in finder body 26. Screw chamber 30 is defined in finder body 26. Bit 22 is configured to engage a screw (not shown) disposed in screw chamber 30 for driving the screw. In some aspects, screw finder 14 comprises sleeve 32 disposed within bore 28 and surrounding shaft 34 of bit 22. Sleeve 32 is sized between bit 22 and bore 28 such that bit 22 maintains a parallel alignment with longitudinal axis 36 of bore 28. Thus, sleeve 32 may constrain the lateral movement of bit 22 and prevent bit 22 from tilting with respect to the screw disposed in screw chamber 30. In particular, an outer diameter of sleeve 32 is equal to an inner diameter of bore 28, an outer diameter of shaft 34 is equal to an inner diameter of sleeve 32, and sleeve 32 extends from proximal portion 40 of bit 22 to screw chamber 30. Thus, bit 22 is secured within sleeve 32 such that bit 22 may maintain alignment with the screw disposed in screw chamber 30. For example, bit 22 is secured within sleeve 32 such that lateral movement is minimized while axial movement is allowed for driving the screw. In some aspects, the outer diameter of sleeve 32 may be slightly less than the inner diameter of bore 28 provided that sleeve 32 is secured within bore 28. For example, the outer diameter of sleeve 32 may be 3.85 millimeters while the inner diameter of bore 28 may be 3.90 millimeters. Similarly, the outer diameter of shaft 34 may be slightly less than the inner diameter of sleeve 32 provided that shaft 34 is secured enough within sleeve 32 such that bit 22 maintains the parallel alignment with longitudinal axis 36.

In some aspects, sleeve 32 is made of turcite or other suitable non-metal material. In this regard, sleeve 32 may contact bit 22, which is typically made of metal such as stainless steel, without generating particles as a result of abrasive metal-to-metal contact between sleeve 32 and bit 22.

According to various aspects of the subject technology, floating head 18 provides flexibility for screwdriver 12 and screw finder 14 to be out of alignment with one another without affecting the alignment of bit 22 and the screw. In other words, floating head 18 provides axial and translational compliance between screw screwdriver 12 and screw finder 14. In some aspects, floating head 18 couples screwdriver 12 to screw finder 14 such that screwdriver 12 may drive bit 22, which extends through bore 28, even if screwdriver 12 and screw finder 14 are out of alignment with one another.

According to certain aspects, floating head 18 comprises screwdriver attachment assembly 24 and screw finder attachment assembly 20. Screwdriver attachment assembly 24 is configured to attach to screwdriver 12 while screw finder attachment assembly 20 is configured to attach to screw finder 14. Using screwdriver attachment assembly 24 and screw finder attachment assembly 20, floating head 18 is configured to translate rotation (e.g., torque) from screwdriver 12 to bit 22 for driving bit 22. In some aspects, floating head 18 is configured to translate this rotation even if screwdriver 12 is out of alignment with screw finder 14.

Figure 3A:
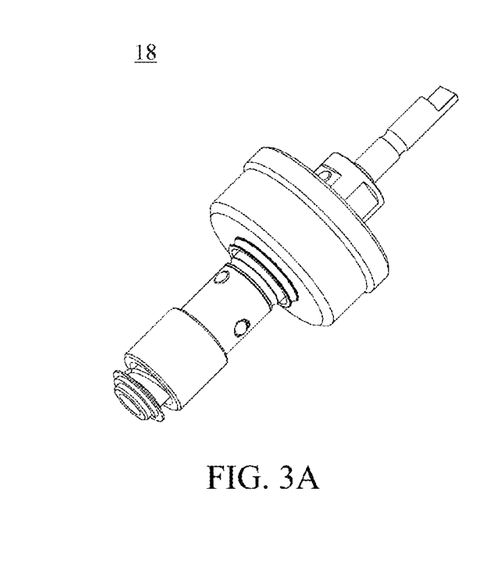
FIG. 3A illustrates a perspective view of a floating head, in accordance with various aspects of the subject technology.
Figure 3B:
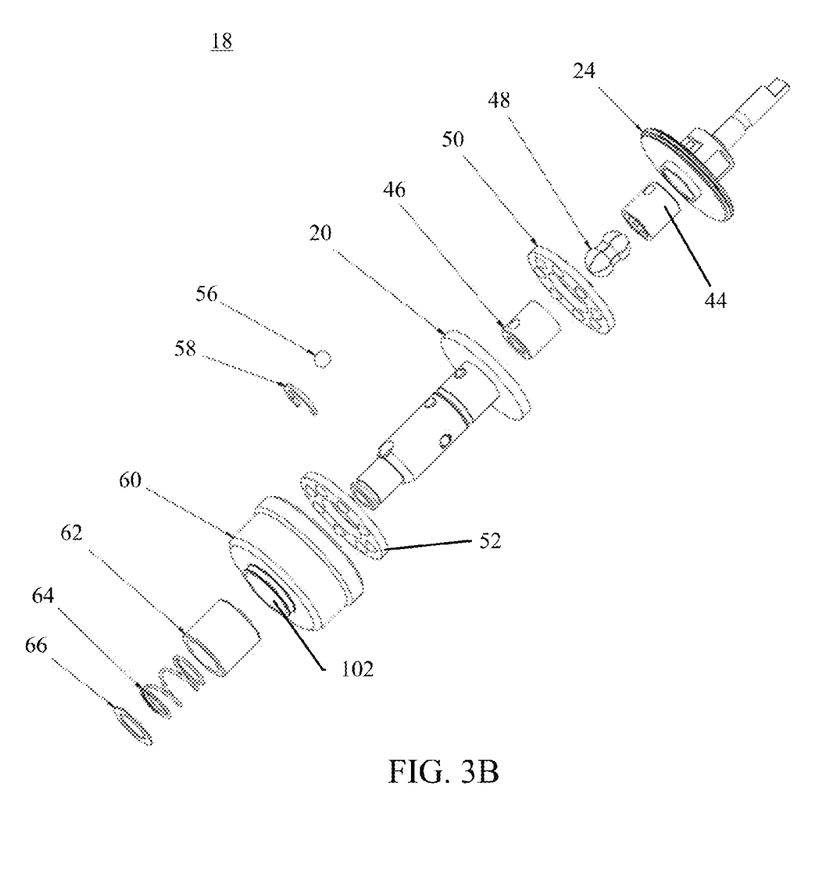
FIG. 3B illustrates an exploded view of a floating head, in accordance with various aspects of the subject technology.

FIG. 3A illustrates a perspective view of floating head 18, in accordance with various aspects of the subject technology. FIG. 3B illustrates an exploded view of floating head 18, in accordance with various aspects of the subject technology. According to certain aspects, floating head 18 comprises housing 60, screwdriver attachment assembly 24, screw finder attachment assembly 20, ball shaft 48, first socket 44, first ball bearing assembly 50, second socket 46, second ball bearing assembly 52, ball bearing 56, clip 58, sleeve 62, spring 64, and berg 66. In some aspects, opening 102 is defined in housing 60.

Figure 4A:
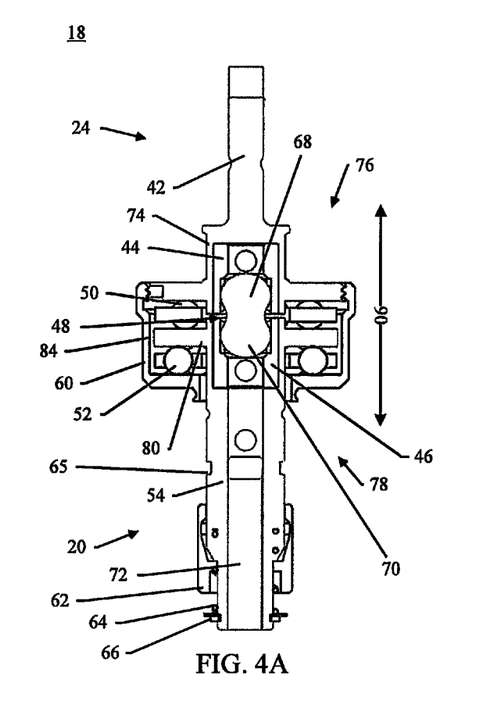
FIG. 4A illustrates a cross-sectional view of a floating head, in accordance with various aspects of the subject technology.

FIG. 4A illustrates a cross-sectional view of floating head 18, in accordance with various aspects of the subject technology. Screwdriver attachment assembly 24 comprises first rotation member 74 coupled to first side 76 of housing 60. Screwdriver attachment assembly 24 also comprises first attachment member 42 coupled to first rotation member 74 and configured to attach to screwdriver 12 for driving first rotation member 74. For example, when first attachment member 42 is attached to screwdriver 12, screwdriver 12 may rotate both first attachment member 42 and first rotation member 74. In some aspects, first rotation member 74 comprises first socket 44. Thus, when first rotation member 74 is rotated, first socket 44 is also rotated.

In some aspects, screw finder attachment assembly 20 comprises second rotation member 80 coupled to second side 78 of housing 60. Screw finder attachment assembly 20 also comprises second attachment member 54 configured to attach to bit 22 such that driving second rotation member 80 drives bit 22. In some aspects, second attachment member 54 comprises cavity 72 configured to receive proximal portion 40 of bit 22. In some aspects, second attachment member 54 comprises a locking mechanism configured to lock proximal portion 40 of bit 22 to cavity 72 of second attachment member 54.

For example, the locking mechanism comprises ball bearing 56 configured to engage bit 22 through hole 65 defined in a wall of second attachment member 54. The locking mechanism further comprises berg 66 attached to a distal tip of second attachment member 54, spring 64 wrapped around a portion of second attachment member above the distal tip, and sleeve 62 surrounding the wall of second attachment member 54 above spring 64. Sleeve 62 may slide up and down with respect to second attachment member 54 from a first configuration to a second configuration and vice versa. In the first configuration (shown in FIG. 2, for example), sleeve 62 covers hole 65 and holds ball bearing 56 against bit 22 when bit 22 is inside cavity 72 for locking bit 22 to cavity 72. Spring 64 applies a force against sleeve 62 such that sleeve 62 is maintained in the first configuration. In the second configuration, sleeve 62 slides down and compresses spring 64 against berg 66 such that sleeve 62 does not cover hole 65 and/or releases its pressure applied against ball bearing 56. Thus, bit 22 is not locked to cavity 72 in the second configuration. Spring 64 is configured to apply a restorative force to sleeve 62 to place sleeve 62 in the first configuration. The locking mechanism further comprises clip 58 configured to engage sleeve 62 and/or ball bearing 56 to lock sleeve 62 in the first configuration, thereby locking proximal portion 40 of bit 22 to cavity 72.

According to various aspects of the subject technology, when second rotation member 80 is rotated and proximal portion 40 of bit 22 is locked into cavity 72, bit 22 is also rotated. In some aspects, second rotation member 80 comprises second socket 46. In some aspects, second rotation member 80 may be rotated by rotating second socket 46, resulting in rotation of bit 22 as well.

According to various aspects of the subject technology, ball shaft 48 is configured to translate rotation of first rotation member 74 to second rotation member 80 for driving bit 22. Ball shaft 48 comprises first end portion 68 engaged in first socket 44 and second end portion 70 engaged in second socket 46. Thus, when first rotation member 74 is driven by screwdriver 12, first socket 44 rotates ball shaft 48, which rotates second socket 46, thereby rotating second rotation member 80 as well as bit 22. In this regard, floating head 18 provides absolute tortional rigidity, allowing rotation to be translated from screwdriver 12 to bit 22 via floating head 18.

In some aspects, first end portion 68 of ball shaft 48 comprises a plurality of faces each configured to contact a corresponding face of first socket 44. In some aspects, second end portion 70 of ball shaft 48 comprises a plurality of faces each configured to contact a corresponding face of second socket 46. For example, first end portion 68 and second end portion 70 may each be a hex bit while first socket 44 and second socket 46 may each be a hex socket. However, first end portion 68 and second end portion 70 may each comprise any number of faces provided that first end portion 68 and second end portion 70 may maintain engagement with first socket 44 and second socket 46, respectively.

According to various aspects of the subject technology, floating head 18 provides flexibility for screwdriver 12 and screw finder 14 to be out of alignment with one another without affecting the alignment of bit 22 and the screw. In other words, floating head 18 provides axial and translational compliance between screw screwdriver 12 and screw finder 14. In particular, housing 60 is configured such that when screwdriver 12 is out of alignment with screw finder 14, first rotation member 74 and second rotation member 80 may be displaced relative to one another along a plane perpendicular to longitudinal axis 90 of housing 60. In particular, at least one of first rotation member 74 and second rotation member 80 may be spaced apart from inner wall 84 of housing 60 such that first rotation member 74 and second rotation member 80 are configured to be displaced relative to one another along the plane perpendicular to longitudinal axis 90.

For example, second rotation member 80 is arranged within housing 60. Second attachment member 54 extends through opening 72 in second side 78 of housing 60. Second rotation member 80 is spaced apart from inner wall 84 such that second rotation member 80 is configured to be displaced relative to first rotation member 74 along the plane perpendicular to longitudinal axis 90. In some aspects, second rotation member 80 may be spaced less than or equal to 0.5 millimeter from inner wall 84, and the displacement between first rotation member 74 and second rotation member 80 may be less than or equal to 0.5 millimeter. However, the spacing between second rotation member 80 and inner wall 84, in addition to the displacement between first rotation member 74 and second rotation member 80, may be greater than 0.5 millimeter depending on the size of screwdriver 12, screw finder 14, the screw disposed within screw chamber 30, bit 22, etc.

According to certain aspects, floating head 18 comprises first ball bearing assembly 50 disposed between first rotation member 74 and second rotation member 80. First ball bearing assembly 50 is configured to facilitate the displacement between first rotation member 74 and second rotation member 80. In some aspects, floating head 18 comprises second ball bearing assembly 52 disposed between second side 78 of housing 60 and second rotation member 80. Second ball bearing assembly 52 is configured to facilitate the displacement between first rotation member 74 and second rotation member 80. Furthermore, second ball bearing assembly 52 is configured to facilitate displacement of second rotation member 80 relative to housing 60. Thus, second rotation member 80 may move relative to housing 60 along the plane perpendicular to longitudinal axis 90.

In some aspects, the subject technology is not limited to second rotation member 80 being arranged within housing 60 and being spaced apart from inner wall 84 to facilitate the displacement relative to first rotation member 74. In some aspects, first rotation member 74 may be arranged within housing 60 in a manner similar to second rotation member 80 as shown in FIG. 4A and may be spaced apart from inner wall 84 to facilitate displacement between first rotation member 74 and second rotation member 80 along the plane perpendicular to longitudinal axis 90. In such a case, second rotation member 80 may be coupled to housing 60 in a manner similar to first rotation member 74 as shown in FIG. 4A.

Figure 4B:
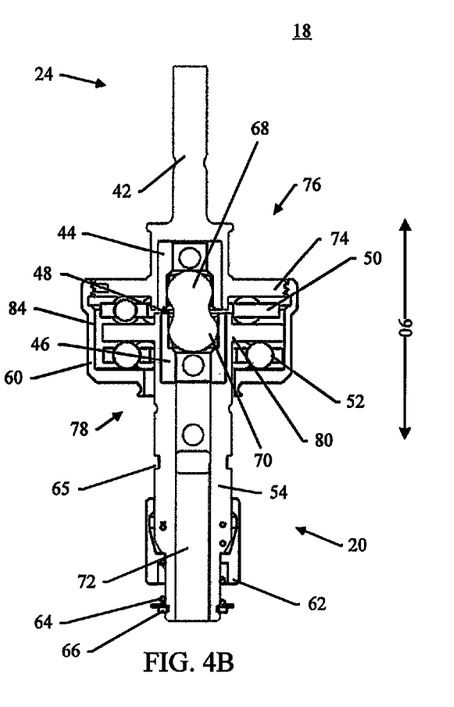
FIG. 4B illustrates a cross-sectional view of a floating head when a first rotation member and a second rotation member are displaced relative to one another, in accordance with various aspects of the subject technology.

According to various aspects of the subject technology, ball shaft 48 is configured to translate the rotation of first rotation member 74 to second rotation member 80 even if screwdriver 12 is out of alignment with screw finder 14. For example, FIG. 4B illustrates a cross-sectional view of floating head 18 when first rotation member 74 and second rotation member 80 are displaced relative to one another, in accordance with various aspects of the subject technology. First rotation member 74 and second rotation member 80 may be displaced relative to one another because screwdriver 12 may be out of alignment with screw finder 14 when screwdriver attachment assembly 24 is attached to screwdriver 12 and when screw finder attachment assembly 20 is attached to screw finder 14. When first rotation member 74 and second rotation member 80 are displaced relative to one another, ball shaft 48 is configured to tilt such that first end portion 68 maintains engagement with first socket 44 and second end portion 70 maintains engagement with second socket 46. Thus, ball shaft 48 may nevertheless translate the rotation from first rotation member 74 to second rotation member 80 despite being tilted. In some aspects, each of first end portion 68 and second end portion 70 comprises a plurality of faces such that the plurality of faces maintain sufficient contact with first socket 44 and second socket 46, respectively, to continue to translate the rotation despite ball shaft 48 being tilted. Thus, floating head 18 provides absolute tortional rigidity even if screwdriver 12 and screw finder 14 are out of alignment with one another.

According to various aspects of the subject technology, floating head 18 may couple screwdriver 12 to screw finder 14 such that bit 22 may maintain alignment with the screw disposed in screw chamber 30. In some aspects, floating head 18 provides axial and translational compliance, in addition to absolute tortional rigidity, between screwdriver 12 and screw finder 15. That is, floating head 18 provides flexibility for screwdriver 12 to be out of alignment with screw finder 15, and allows bit 22 to be driven by screwdriver 12 even if screwdriver 12 is out of alignment with screw finder 15.

Figure 5:
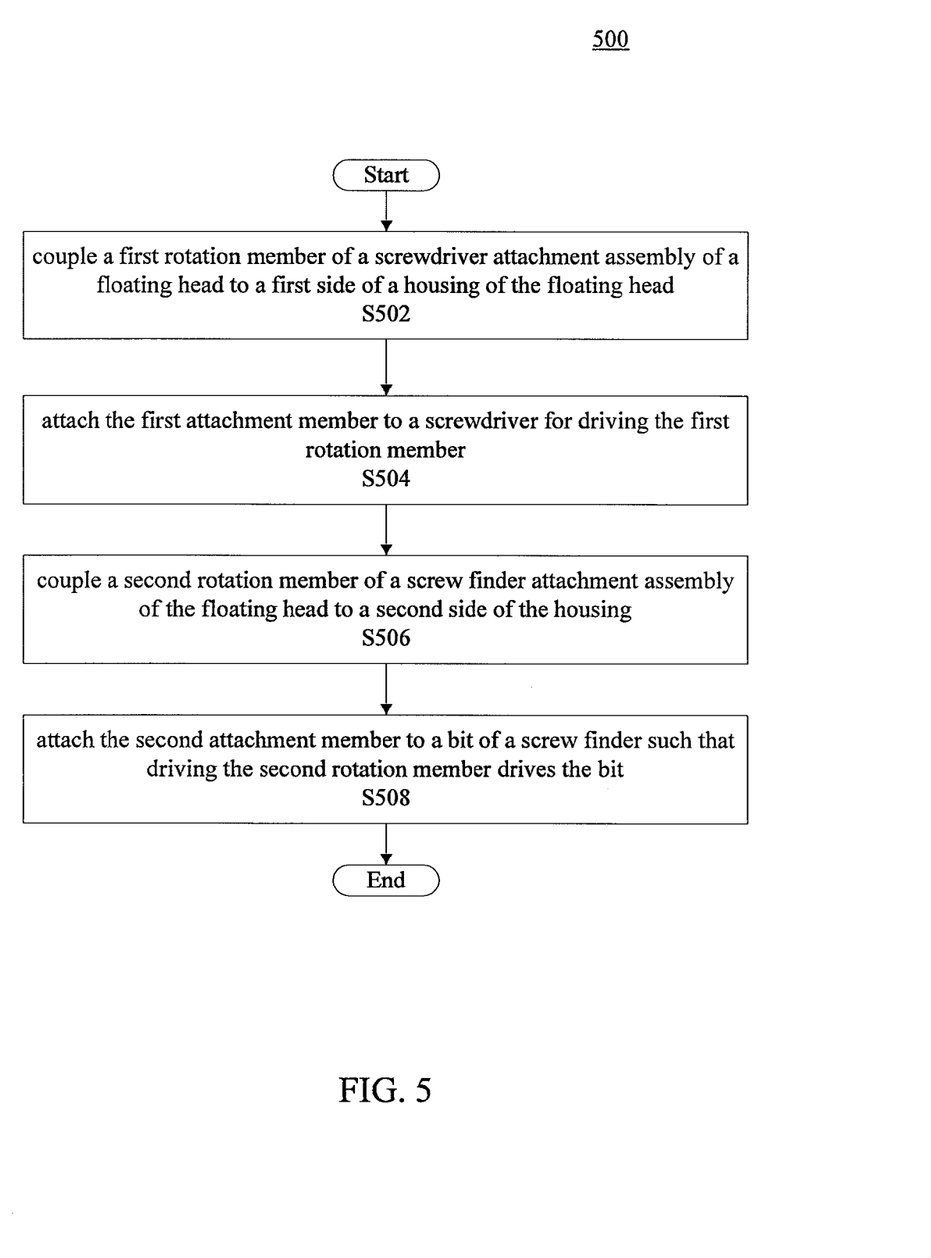
FIG. 5 illustrates a method for coupling a screwdriver to a screw finder, in accordance with various aspects of the subject technology.

FIG. 5 illustrates method 500 for coupling a screwdriver to a screw finder, in accordance with various aspects of the subject technology. Method 500 comprises coupling a first rotation member of a screwdriver attachment assembly of a floating head to a first side of a housing of the floating head (step S502). A first attachment member of the screwdriver attachment assembly is coupled to the first rotation member. Method 500 also comprises attaching the first attachment member to a screwdriver for driving the first rotation member (step S504). Method 500 also comprises coupling a second rotation member of a screw finder attachment assembly of the floating head to a second side of the housing (step S506). A second attachment member of the screw finder attachment assembly is coupled to the second rotation member. Method 500 also comprises attaching the second attachment member to a bit of a screw finder such that driving the second rotation member drives the bit (step S508). A ball shaft of the floating head comprises a first end portion engaged in a first socket of the first rotation member and a second end portion engaged in a second socket of the second rotation member.

When the first rotation member is driven by the screwdriver, the ball shaft is configured to translate rotation of the first rotation member to the second rotation member for driving the bit. The first rotation member and the second rotation member are configured to be displaced relative to one another along a plane perpendicular to a longitudinal axis of the housing. When the first rotation member and the second rotation member are displaced relative to one another, the ball shaft is configured to tilt such that the first end portion maintains engagement with the first socket and the second end portion maintains engagement with the second socket.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear," "up," "down," "above" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A floating head for coupling a screwdriver to a screw finder, the floating head comprising:
    a housing;
    a screwdriver attachment assembly having a first rotation member coupled to a first side of the housing and a first attachment member coupled to the first rotation member and configured to attach to a screwdriver for driving the first rotation member;
    a screw finder attachment assembly having a second rotation member coupled to a second side of the housing and a second attachment member coupled to the second rotation member, the second attachment member configured to attach to a bit of a screw finder such that driving the second rotation member drives the bit, wherein at least one of the first rotation member and the second rotation member is spaced apart from an inner wall of the housing such that the first rotation member and the second rotation member are configured to be displaced relative to one another along a plane perpendicular to a longitudinal axis of the housing; and
    a ball shaft having a first end portion engaged in a first socket of the first rotation member and a second end portion engaged in a second socket of the second rotation member, wherein when the first rotation member is driven by the screwdriver, the ball shaft is configured to translate rotation of the first rotation member to the second rotation member for driving the bit, and wherein when the first rotation member and the second rotation member are displaced relative to one another, the ball shaft is configured to tilt such that the first end portion maintains engagement with the first socket and the second end portion maintains engagement with the second socket.

2. The floating head of claim 1, further comprising a first ball bearing assembly disposed between the first rotation member and the second rotation member, the first ball bearing assembly configured to facilitate the displacement between the first rotation member and the second rotation member.

3. The floating head of claim 1, wherein the second rotation member is arranged within the housing, wherein the second attachment member extends through an opening in the second side of the housing, and wherein the second rotation member is spaced apart from the inner wall of the housing such that the second rotation member is configured to be displaced relative to the first rotation member along the plane perpendicular to the longitudinal axis of the housing.

4. The floating head of claim 3, wherein the second rotation member is spaced less than or equal to 0.5 millimeter from the inner wall of the housing, and wherein the displacement between the first rotation member and the second rotation member is less than or equal to 0.5 millimeter.

5. The floating head of claim 3, further comprising a ball bearing assembly disposed between the second side of the housing and the second rotation member, the ball bearing assembly configured to facilitate the displacement between the first rotation member and the second rotation member.

6. The floating head of claim 1, wherein the second attachment member comprises a cavity configured to receive a proximal portion of the bit of the screw finder.

7. The floating head of claim 6, wherein the second attachment member further comprises a locking mechanism configured to lock the proximal portion of the bit of the screw finder to the cavity of the second attachment member.

8. The floating head of claim 1, wherein the first end portion of the ball shaft comprises a plurality of faces each configured to contact a corresponding face of the first socket, and wherein the second end portion of the ball shaft comprises a plurality of faces each configured to contact a corresponding face of the second socket.

9. The floating head of claim 8, wherein the first end portion of the ball shaft comprises a hex bit, wherein the first socket comprises a hex socket, wherein the second end portion of the ball shaft comprises a hex bit, and wherein the second socket comprises a hex socket.

10. A screw driving system comprising:
    a screwdriver;
    a screw finder comprising:
        a finder body;
        a bit extending through a bore defined in the finder body, the bit configured to engage a screw disposed in a screw chamber defined in the finder body for driving the screw; and
        a sleeve disposed within the bore and surrounding a shaft of the bit, the sleeve sized between the bit and the bore such that the bit maintains a parallel alignment with a longitudinal axis of the bore; and
    a floating head for coupling the screwdriver to the screw finder, the floating head comprising:
        a housing;
        a screwdriver attachment assembly having a first rotation member coupled to a first side of the housing and a first attachment member coupled to the first rotation member and attached to the screwdriver, the screwdriver configured to drive the first rotation member;
        a screw finder attachment assembly having a second rotation member coupled to a second side of the housing and a second attachment member coupled to the second rotation member, the second attachment member attached to the bit such that driving the second rotation member drives the bit, wherein at least one of the first rotation member and the second rotation member is spaced apart from an inner wall of the housing such that the first rotation member and the second rotation member are configured to be displaced relative to one another along a plane perpendicular to a longitudinal axis of the housing; and a ball shaft having a first end portion engaged in a first socket of the first rotation member and a second end portion engaged in a second socket of the second rotation member, wherein when the first rotation member is driven by the screwdriver, the ball shaft is configured to translate rotation of the first rotation member to the second rotation member for driving the bit, and wherein when the first rotation member and the second rotation member are displaced relative to one another, the ball shaft is configured to tilt such that the first end portion maintains engagement with the first socket and the second end portion maintains engagement with the second socket.

11. The system of claim 10, wherein the sleeve is made of turcite.

12. The system of claim 10, wherein an outer diameter of the sleeve is equal to an inner diameter of the bore, wherein an outer diameter of the shaft of the bit is equal to an inner diameter of the sleeve, and wherein the sleeve extends from a proximal portion of the bit to the screw chamber.

13. The system of claim 10, wherein the screw finder further comprises a feeder assembly configured to feed the screw into the screw chamber.

14. The system of claim 10, further comprising a main body, wherein the screwdriver and the screw finder are attached to the main body.

15. A method for coupling a screwdriver to a screw finder, the method comprising:

coupling a first rotation member of a screwdriver attachment assembly of a floating head to a first side of a housing of the floating head, wherein a first attachment member of the screwdriver attachment assembly is coupled to the first rotation member;

attaching the first attachment member to a screwdriver for driving the first rotation member;

coupling a second rotation member of a screw finder attachment assembly of the floating head to a second side of the housing, wherein a second attachment member of the screw finder attachment assembly is coupled to the second rotation member; and attaching the second attachment member to a bit of a screw finder such that driving the second rotation member drives the bit, wherein a ball shaft of the floating head comprises a first end portion engaged in a first socket of the first rotation member and a second end portion engaged in a second socket of the second rotation member, and wherein when the first rotation member is driven by the screwdriver, the ball shaft is configured to translate rotation of the first rotation member to the second rotation member for driving the bit, wherein the first rotation member and the second rotation member are configured to be displaced relative to one another along a plane perpendicular to a longitudinal axis of the housing, and wherein when the first rotation member and the second rotation member are displaced relative to one another, the ball shaft is configured to tilt such that the first end portion maintains engagement with the first socket and the second end portion maintains engagement with the second socket.

16. The method of claim 15, further comprising spacing apart at least one of the first rotation member and the second rotation member from an inner wall of the housing to facilitate the displacement between the first rotation member and the second rotation member.

17. The method of claim 15, further comprising:
driving, with the screwdriver, the first rotation member; and
translating, with the ball shaft, rotation of the first rotation member to the second rotation member for driving the bit.

18. The method of claim 15, further comprising tilting the ball shaft such that the first end portion maintains engagement with the first socket and the second end portion maintains engagement with the second socket when the first rotation member and the second rotation member are displaced relative to one another.

19. The method of claim 15, further comprising receiving a proximal portion of the bit into a cavity of the second attachment member.

20. The method of claim 19, further comprising locking the proximal portion of the bit to the cavity of the second attachment member.

* * * * *